Patented Oct. 10, 1933

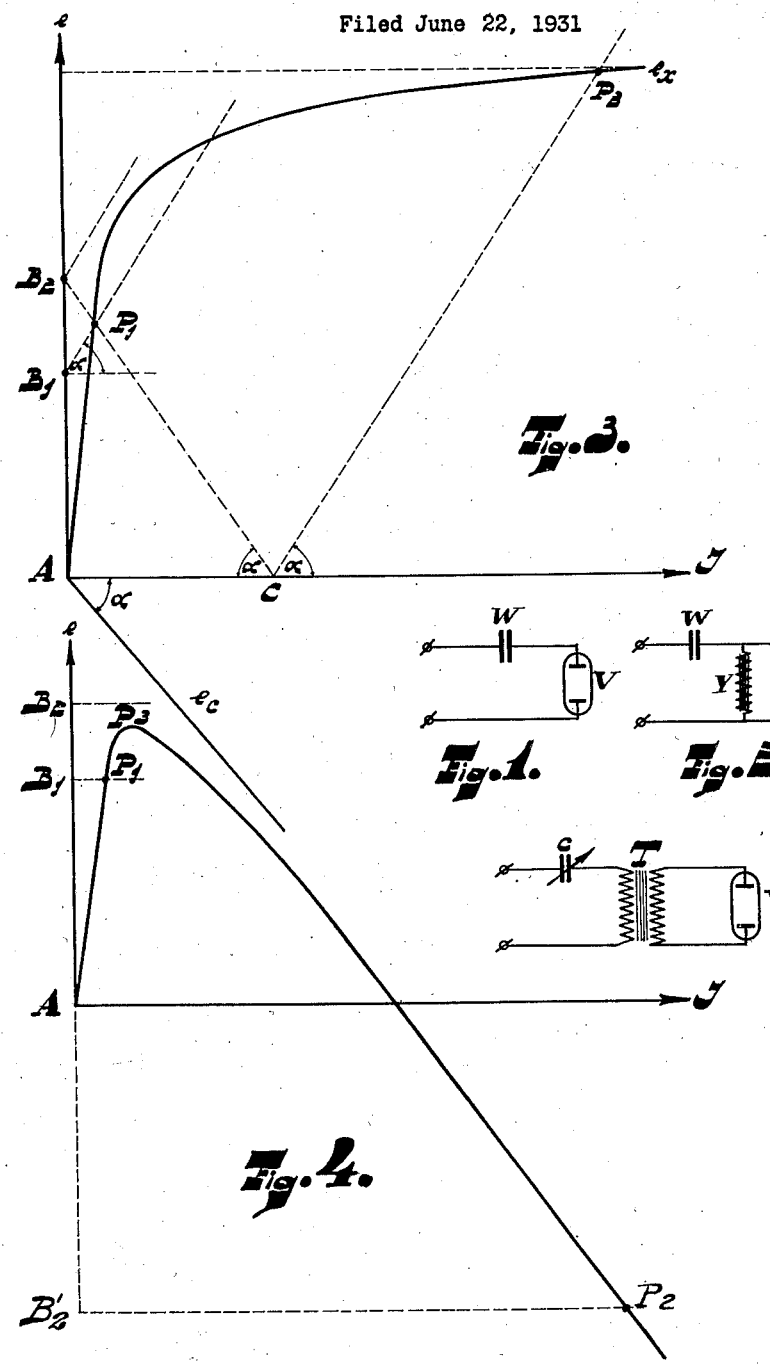

1,930,127

UNITED STATES PATENT OFFICE 1,930,127

CIRCUIT FOR GASEOUS ELECTRIC DISCHARGE DEVICES

Hendrik Abraham Wijnand Klinkhamer, Eindhoven, Netherlands, assignor, by mesne assignments, to General Electric Company, a corporation of New York Application June 22, 1931, Serial No. 546,140, and in the Netherlands July 26, 1930

8 Claims. (Cl. 171—119)

This invention relates to circuit arrangements for the supply of electric energy to loads consisting of devices of which the starting or ignition voltage is higher than the operating voltage (for instance, luminous tubes) and in which the supply takes place by means of a transformer.

It is one object of the invention to provide an arrangement for feeding such loads, which is simple, inexpensive and economical to operate.

A further object is to provide an arrangement of which the output voltage is substantially unaffected by variations of the supply voltage.

Other objects will appear as the specification progresses.

In circuit arrangements of the above type, it is known to automatically raise the voltage when going over from load to no-load condition, so as to provide automatically the higher starting voltage. In a direct current apparatus, this is obtained by inserting in the circuit a resistance which causes a drop of potential during operation of the device, which potential drop disappears when the load is interrupted. In an alternating current apparatus, a reactance may be used instead of a resistance. This reactance may be provided, for example, by using a transformer having a large leakage field. This however requires an over-dimensioned transformer. Or the voltage drop may be obtained by using a condenser, thus a negative reactance, inserted between the load and the supply.

In all of the arrangements of the prior art, the excess voltage required for starting has been obtained exclusively by providing a potential drop between the supply and the load, which potential drop disappears at no-load.

In the arrangement of the invention, on the other hand, the major part of the required voltage increase is obtained by automatically producing, at no-load, a voltage increase which does not exist at all at load. The invention will be more clearly understood on hand of an embodiment of the invention.

In the drawing forming part of this specification, Figure 1 represents a diagram showing an arrangement in which a condenser is connected in series with a load having a higher starting voltage than operating voltage and represented by a luminous tube.

Fig. 2 is a schematic diagram showing a circuit arrangement similar to that of Fig. 1, whereby an inductive reactance is shown in multiple with the load.

Fig. 3 is a curve showing the reactive E.M.F. as a function of the current intensity in a transformer or choke coil as well as in a condenser, and also showing the method of determining relative values of terminal voltages and induced voltages in arrangements of the type described.

Fig. 4 is a curve showing the voltage variation across the combination of the condenser and reactance in arrangements of the type described.

Fig. 5 is a circuit arrangement similar to that of Fig. 2, also including a transformer, the primary of which is connected in series with a variable condenser and the secondary of which is connected to the load.

In the case of a standard transformer as used in the prior art, the magnetizing current of the transformer, both at load or no-load, is small compared with the load current and its influence can be neglected. Fig. 1 represents the conditions as they exist in such a case; thereby the condenser $w$ acts similarly to the resistance in the case of direct current. Thus at load, it provides a voltage drop, which voltage drop disappears at no-load; and the no-load voltage on the transformer has approximately the same value as the supply voltage.

According to the invention, a series condenser is provided in the primary circuit of a transformer, whereby the transformer and the condenser are so dimensioned that the no-load current is in advance of the supply voltage and produces a strong saturation of the transformer core. At load, however, the saturation in the core is greatly reduced and the load current is preferably much smaller than the no-load current.

Thereby the conditions for no-load can no longer be represented by Fig. 1, since the magnetizing current is no longer small compared to the operating current and the conditions have to be represented as shown in Fig. 2, where a reactance $y$ is shown in series with the condenser $w$. On the other hand, at load the voltage at the transformer being greatly reduced and the transformer being no longer highly saturated, the reactance corresponding to the magnetization current shown in Fig. 2 may be again neglected. Thus in case of load, the showing of Fig. 2 can be replaced by that of Fig. 1.

At no load the load-branch of the diagram shown in Fig. 2 is interrupted so that there remains only the series-connection of the capacity reactance and the magnetization reactance. These constitute together an oscillatory circuit due to which at no load the voltage set up at the magnetization reactance, i. e. the transformer voltage becomes higher than the network voltage. The part played by the saturation of the transformer will be explained hereinafter.

It will be obvious that in the arrangement according to the invention, the condenser must be inserted in the primary circuit and not in the secondary circuit. In fact, were the condenser placed in the secondary circuit, there would be no oscillatory circuit upon interrupting the load and the voltage set up in the primary winding of the transformer would not be increased above the network voltage. The arrangement according to the invention has many advantages over the known arrangements, which will be pointed out hereinafter, while at the same time it satisfies the main condition referred to above i. e. that the tension set up at the load is increased automatically upon interrupting the load.

In further discussion of the invention it is assumed that the circuit arrangement is used for operating luminous tubes, having higher ignition voltages than operating voltages although, of course, the same advantages are obtained when feeding other loads in which the starting voltage is higher than the operating voltage.

The dimensions of the transformer are determined by the required full-load current and the no-load voltage. It is advantageous to arrange a no-load induction of the transformer as large as possible by providing a very high saturation of the core. As it will appear hereafter, for a given starting voltage, or as this determines the maximum arc in the tube, for a given tube length, when using the invention, a transformer having a core of much smaller cross section may be used, than when using the arrangement of the prior art. It is true that the no-load losses are increased by using the arrangement of the invention; but as the no-load state is only transitory, these losses do not cause heating up of the transformer and do not need to be considered.

A further advantage of the arrangement according to the invention is that it permits an automatic control of the no-load voltage, owing to which this voltage may have a constant value independent of the variations in the network voltage.

In the known arrangements having a not highly saturated core the no-load voltage is proportional to the network voltage and consequently follows all variations of the network voltage. As the highest network voltage is predetermined, the corresponding no-load voltage or starting voltage cannot exceed a prescribed maximum. On the other hand the length of the tube must be so selected that the arc may be reliably started even at the lowest network voltage. If the network voltage shows variations of 10%, for instance, the lowest voltage value can only be relied upon for starting the tube, and the tube length which may be used is only 80% of the tube length which might be used if the voltage would have continually its maximum value. This is not the case in the arrangement according to the invention and merely on this account 25% in the cost of the transformer can be saved.

When connecting several loads which require a different operating current, the current may be readily adjusted to the desired value. A simple way to obtain this is by making the series-condenser adjustable in providing it, for example, with a plurality of taps. This constitutes an advantage over the arrangement comprising a leakage transformer in which the value of the leak cannot readily be modified over a wide range.

The operation of the arrangement according to the invention will be explained by reference to Fig. 3 and 4 of the drawing.

In Fig. $e_x$ denotes the effective reactive E. M. F. of an iron choke coil or transformer as a function of the effective current intensity. The line $e_c$ which is at an angle $x$ with the I-axis designates the reactive-electro-motive force of the constant capacitance $X_c$.

Fig. 4 shows the variation of the total voltage across the combination of the series connected choke coil (or transformer) and capacitance as a function of the current. As it will appear from the figure, the voltage first increases with increasing current until it reaches a maximum value, then it decreases to zero and crosses the I-axis to assume increasing negative values. It thus appears that at small current intensities the combination acts as an inductance and at high current intensities at a capacitance. For instance if a terminal voltage $AB_1$ is applied to this series-combination the current increases until the reaction voltage is in equilibrium with the terminal voltage, viz until the point $P_1$ having the ordinate $AB_1$ is reached.

Such condition substantially corresponds to the no-load conditions present when using a series combination of a low saturation transformer with a condenser, as is the case in the prior art arrangements, in which case the combination acts as an inductance. On the other hand, if the terminal voltage is selected to have a value $B_2$ which exceeds the value corresponding to the highest point $P_3$ of the curve, the current increases until again equilibrium of voltage is reached. This, however, can only be reached when the value $AB'_2$ is obtained corresponding to the point $P_2$, which lies in the part of the curve below the abcissa axis. In this case, which corresponds to that of the no-load condition of the arrangement according to the invention, the combination acts as a capacitance.

From the above it will thus appear that for no-load conditions in the case of the prior art, the series connection acts as an inductance, whereas in the case of applicant it acts as a capacitance.

Further conclusions my be derived from Figure 3, in which the points $B_1$ and $B_2$ correspond to the points $B_1$ and $B_2$ of Figure 4 and represent the terminal voltages. The voltage across the primary winding of the transformer can be obtained by determining the intersections of the curve $e_x$ with straight lines drawn from these points, which enclose with a parallel to the I-axis an angle $x$ previously defined. It will be noted that the dotted lines drawn from point $B_1$ intersect the curve $e_x$ at a point $P_1$, this point corresponding to the voltage across the transformer at no-load. On the other hand, if a similar line is drawn from the point $P_2$ (see upper dotted line from $P_2$), this line does not intersect the curve $e_x$.

To determine the point $P_2$ corresponding to $B_2$, a dotted line is drawn from point $B_2$ which encloses with the abcissa axis an angle $x$ and intersecting same at a point $C$. From the point $C$, a second line is drawn, which encloses an angle $x$ with the far end of the I-axis, and intersects the curve $e_x$ at $P_2$ which corresponds to the no-load voltage in the arrangement of the invention.

The ordinates $B_1$ and $B_2$ thus represent the terminal voltages and the ordinates $P_1$ and $P_2$ indicate the reactive E. M. F. of the choke coil (transformer),—in other words, the no-load voltages.

It will be apparent that if the series combination of the choke coil and condenser is an inductance, as is the case in the arrangements of the prior art, the voltage across the load may be only slightly increased above the terminal voltage. On the other hand, if the series combination of the condenser and the choke coil (transformer) in view of the high saturation of the later, is a capacitance, as is the case in the arrangement of the invention, the no-load voltage is much in excess of the terminal voltage.

From Figure 3 a further advantage of the invention is also evident, i. e., that the no-load voltage is substantially unaffected by variations in the network or terminal voltage. This is due to the fact that the point $P_2$ falls on the flat portion of the magnetization curve and any variation in the terminal voltage $B_2$ would cause a much smaller variation in the voltage $P_2$. This is evidently not the case for the points $B_1$ and $P_1$.

Fig. 5 shows a circuit arrangement according to the invention, in which T is a transformer of which the core consists of alloy sheets in which the magnetic induction is very high 13000 to 15000 lines per sq. cm., for instance. A variable condenser $e$ of which the capacity is so selected as to provide for the proper value of the operating current is connected in series with the primary winding of the transformer. V is the load shown as a luminous discharge tube.

In the arrangement according to the invention the short-circuit current only slightly exceeds the full-load current, so that the transformer is not damaged by short-circuits.

However, it is advisable to protect the transformer from a prolonged passage of the no-load current, which might occur when the tube breaks down in operation, whereby the high saturation of the core and the large no-load currents in the transformer may cause its excessive heating. By providing a safety fuse in the primary circuit which comes in operation upon prolonged passage of the no-load current, this danger is removed. As the short-circuit current is smaller than the no-load current and short-circuiting does not damage the transformer, this fuse will be sufficient to fully protect the transformer.

What I claim is:

1. A circuit arrangement for supplying electric energy to a device having a higher starting voltage than its operating voltage, comprising a transformer and a primary circuit therefor and a core for said transformer, a condenser connected in said primary circuit, said condenser and transformer being so dimensioned that at no-load the current is in advance of the supply voltage and the core of the transformer is highly saturated, and that at load saturation of said core is reduced.

2. A circuit arrangement for supplying electric energy to a load having a higher starting voltage than its operating voltage, comprising a transformer having a primary winding, a secondary winding and a core, a condenser connected in series with the primary winding, and said load connected to said secondary winding, said transformer and condenser being so dimensioned that at no-load the current is in advance of the supply voltage and the core of the transformer is highly saturated and that at load said core is not saturated.

3. A circuit arrangement for supplying electric energy to a load having a higher starting voltage than its operating voltage, comprising a choke coil and a core for said choke coil, a condenser in series connection with said choke coil, and said load connected in multiple with said choke coil, said condenser and choke coil being so dimensioned that at no-load the current is in advance of the supply voltage and a high saturation of the core is produced, and that at load said core is not highly saturated.

4. A circuit arrangement for supplying electric energy to a device having a higher starting voltage than its operating voltage, comprising a transformer having a primary circuit and a core, a condenser connected in said primary circuit, said condenser and transformer being so dimensioned that the no-load current is in advance of the supply voltage and considerably exceeds the value of the load current, and that a high saturation of the core is produced at no-load, while at load the saturation of the core is considerably reduced.

5. A circuit arrangement for supplying electric energy to a device having a higher starting voltage than its operating voltage, comprising a source of alternating voltage, a coil and a ferromagnetic core therefor, an adjustable condenser connected in series with said source and said coil, and said device connected in multiple with said coil, said core and said condenser being so dimensioned that the current before said device is loaded is in advance of the supply voltage and produces a strong saturation of said core which considerably exceeds the saturation of said core after said device is loaded.

6. A circuit arrangement for supplying electric energy to a device having a higher starting voltage than its operating voltage, comprising a coil and a ferro-magnetic core therefor, a source of alternating current supply and a condenser connected in series with said source of supply and said coil, and said device connected in multiple with said coil, said condenser, coil and core being so dimensioned that before said device is loaded the voltage across said coil greatly exceeds the voltage of said source of supply, the current is in advance of the supply voltage, and the saturation of said core is considerably higher than the saturation thereof after said device is loaded.

7. A circuit arrangement for supplying electric energy to a discharge tube having a higher ignition voltage than its operating voltage, comprising a transformer having a primary winding and a secondary winding, and a ferro-magnetic core, said tube being connected to said secondary winding, a source of alternating current supply and an adjustable condenser connected in series with said source of supply and said primary winding, said condenser and transformer being so dimensioned that at no-load the current is in advance of the supply voltage and the core of the transformer is highly saturated and the voltage of the primary winding considerably exceeds the voltage of the source of supply, and that at load the current is smaller than at no-load and the saturation of the core greatly reduced, and a fuse connected in series with said primary winding and adapted to prevent a prolonged flow of the no-load current.

8. A circuit arrangement for supplying electric energy to a device having a higher starting voltage than its operating voltage, comprising a transformer and a primary circuit therefor and a core for said transformer, a condenser connected in said primary circuit, said condenser and transformer being so dimensioned that at no-load the voltage drop in said condenser is approximately equal to the reactive voltage drop in said transformer primary.

HENDRIK ABRAHAM
WIJNAND KLINKHAMER.